(12) United States Patent
Liu et al.

(10) Patent No.: US 11,970,397 B2
(45) Date of Patent: Apr. 30, 2024

(54) METHOD FOR PREPARING NANO-POROUS CARBON MATERIAL

(71) Applicant: SUN YAT-SEN UNIVERSITY, Guangzhou (CN)

(72) Inventors: Yang Liu, Guangzhou (CN); Chao Zhang, Guangzhou (CN); Pengfei Yin, Guangzhou (CN); Jiareng Chen, Guangzhou (CN); Bin Cui, Guangzhou (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 498 days.

(21) Appl. No.: 17/436,993

(22) PCT Filed: Apr. 28, 2019

(86) PCT No.: PCT/CN2019/084734
§ 371 (c)(1),
(2) Date: Sep. 7, 2021

(87) PCT Pub. No.: WO2020/181633
PCT Pub. Date: Sep. 17, 2020

(65) Prior Publication Data
US 2022/0177310 A1     Jun. 9, 2022

(30) Foreign Application Priority Data
Mar. 14, 2019   (CN) .......... 201910195196.7

(51) Int. Cl.
*C01B 32/05*      (2017.01)
*C08G 73/06*      (2006.01)

(52) U.S. Cl.
CPC .......... *C01B 32/05* (2017.08); *C08G 73/0611* (2013.01); *C01P 2002/82* (2013.01); *C01P 2004/04* (2013.01)

(58) Field of Classification Search
CPC ..... C01B 32/05; C01B 32/00; C08G 73/0611; C08G 2261/11; C08G 2261/3221;
(Continued)

(56) References Cited

FOREIGN PATENT DOCUMENTS

| CN | 103643339 A | 3/2014 |
|---|---|---|
| CN | 105293472 A | 2/2016 |

(Continued)

OTHER PUBLICATIONS

English Translation of Written Opinion of the International Searching Authority in PCT/CN2019/084734 (Year: 2019).*
(Continued)

*Primary Examiner* — Daniel C. McCracken
(74) *Attorney, Agent, or Firm* — D'Ambrosio & Menon, PLLC; Usha Menon

(57) ABSTRACT

Disclosed is a method for preparing a nano-porous carbon material, comprising the following steps of: mixing polypyrrole nano-fibers with an activator, conducting microwave heating for reaction, and purifying to obtain the nano-porous carbon material. Compared with a conventional high-temperature carbonization method, the method for preparing the nano-porous carbon material of the present disclosure is simple in raw material, convenient to operate, less in time consumption and more suitable for mass preparation and production of the nano-porous carbon materials.

19 Claims, 3 Drawing Sheets

(58) Field of Classification Search
CPC .............. C08G 61/124; C01P 2002/82; C01P 2004/04; C01P 2006/12; C01P 2006/16; C08L 65/00; B82Y 40/00
USPC ................................................ 502/416–438
See application file for complete search history.

(56) References Cited

FOREIGN PATENT DOCUMENTS

| | | |
|---|---|---|
| CN | 106744803 A | 5/2017 |
| CN | 107665775 A | 2/2018 |

OTHER PUBLICATIONS

Machine Translation of CN 105293472 to Univ. Shaoxing (Year: 2016).*
Machine Translation of CN 107665775 to Univ. Yangzhou (Year: 2018).*
Zhang, et al., Microwave synthesis of nanocarbons from conducting polymers, Chem. Commun. 2006: 2477-2479 (hereinafter " Zhang at _") (Year: 2006).*
Zhang, et al., Narrow Pore-Diameter Polypyrrole Nanotubes, J. Am. Chem. Soc. 2005; 127: 14156-14157 (Year: 2005).*
Wei, et al, Polypyrrole-Derived Activated Carbons for High-Performance Electrical Double-Layer Capacitors with Ionic Liquid Electrolyte, Adv. Funct. Mater. 2012; 22: 827-834 with Supporting Information (Year: 2012).*
Ji, et al., Preparation of activated carbons by microwave heating KOH activation, Applied Surface Science 2007; 254: 506-512 (Year: 2007).*

\* cited by examiner

METHOD FOR PREPARING NANO-POROUS CARBON MATERIAL

CROSS-REFERENCE TO RELATED APPLICATIONS

The present application is a national phase entry under 35 USC § 371 of International Application PCT/CN2019/084734, filed on Apr. 28, 2019, which claims the benefit of and priority to Chinese Patent Application No. 2019101951967, filed on Mar. 14, 2019, the entire disclosures of which are incorporated herein by reference.

TECHNICAL FIELD

The present disclosure relates to a nano-porous carbon material, in particular to a preparation method for a nano-porous carbon material.

BACKGROUND

Nano-porous carbon materials are a type of porous carbon materials with uniform nano-pore size distribution, high specific areas and high microporosity, which are widely applied in adsorption, catalysis, energy storage and sewage treatment.

Current preparation methods of nano-porous carbon materials mainly include several steps such as precursor synthesis, precursor carbonization and activation, which are cumbersome and relatively high in cost. In current preparation methods, generally a precursor with regular nano-pore size structure should be synthesized at first, such as zeolite molecular sieve MCM-41, a silicon dioxide molecular sieve SBA-15, a colloidal crystal and an organic metal frame; the precursor is treated with high-temperature carbonization for several hours under inert gas protection; and then the nano-porous carbon material obtained by carbonization is activated physically or chemically, to increase the specific area and the micropore volume.

At present, the methods of preparing the nano-porous carbon materials have the disadvantages of cumbersome steps, huge consumption and high cost. In order to further realize large-scale preparation and application of the nano-porous carbon materials, the preparation methods of the nano-porous carbon materials should be improved.

SUMMARY

In order to overcome the problems in the prior art, an objective of the present disclosure is to provide a simple and rapid one-step preparation method of a nano-porous carbon material.

To achieve the above objective, the following technical solution is used in the present disclosure:
a method for preparing a nano-porous carbon material, comprising the following steps of: mixing polypyrrole nano-fibers with an activator, conducting microwave heating for reaction, and purifying to obtain the nano-porous carbon material.

Preferably, in the method for preparing the nano-porous carbon material, a mass ratio of the polypyrrole nano-fibers and the activator is 1:(1-5.5); and more preferably, the mass ratio of the polypyrrole nano-fibers and the activator is 1:(4-5.5).

Preferably, in the method for preparing the nano-porous carbon material, a method for preparing the polypyrrole nano-fibers comprises the following steps of: mixing a pyrrole monomer with a solvent to obtain a pyrrole monomer solution, and reacting the pyrrole monomer solution with vanadium pentoxide sol and an oxidizing agent to obtain the polypyrrole nano-fibers.

Preferably, in the method for preparing the polypyrrole nano-fibers, a ratio of raw materials is as follows: a volume ratio of the pyrrole monomers, the solvent and the vanadium pentoxide sol is 1:(40-80):(0.5-5), and a ratio of the pyrrole monomer and the oxidizing agent is 1 mL:(0.5-5) g; and more preferably, the volume ratio of the pyrrole monomer, the solvent and the vanadium pentoxide sol is 1:(50-70):(0.8-2).

Preferably, in the method for preparing the polypyrrole nano-fibers, the solvent is at least one selected from the grouping consisting of hydrochloric acid, sulfuric acid and nitric acid; and more preferably, the solvent is hydrochloric acid, and a concentration of hydrochloric acid is preferably 0.5 mol/L-2 mol/L.

Preferably, in the method for preparing the polypyrrole nano-fibers, the vanadium pentoxide sol is obtained by reacting ammonium metavanadate with an aqueous dispersion liquid of cation exchange resin.

Preferably, in the method for preparing the polypyrrole nano-fibers, a specific method for preparing the vanadium pentoxide sol comprises the following steps of: mixing the cation exchange resin with water, then adding the ammonium metavanadate for uniform mixing, and aging to obtain the vanadium pentoxide sol.

Preferably, in the specific method for preparing the vanadium pentoxide sol, a mass ratio of the cation exchange resin, the water and the ammonium metavanadate is 1:(10-50):(0.05-0.2); and more preferably, the mass ratio of the cation exchange resin, the water and the ammonium metavanadate is 1:(15-35):(0.08-0.15).

Preferably, in the specific method for preparing the vanadium pentoxide sol, the cation exchange resin is Dowex 50WX8 ion exchange resin.

Preferably, in the specific method for preparing the vanadium pentoxide sol, the time for aging is 3-20 days.

Preferably, in the method for preparing the polypyrrole nano-fibers, the oxidizing agent is at least one selected from the grouping consisting of persulfate, ferric chloride, ferric nitrate, ferric sulfate and hydrogen peroxide; more preferably, the oxidizing agent is persulfate; and most preferably, the oxidizing agent is at least one selected from the grouping consisting of potassium persulfate, sodium persulfate and ammonium persulfate.

Preferably, in the method for preparing the polypyrrole nano-fibers, a reacting time is 0.5 h-2 h.

Preferably, in the method for preparing the polypyrrole nano-fibers, the method further comprises a purifying step, wherein the purifying step comprises filtering, washing and drying; more preferably, filtering is suction filtration; washing comprises washing the resulting product with hydrochloric acid, deionized water and ethyl alcohol successively, and washing is repeated for at least three times; and drying is conducted for 10 h-20 h at 50° C.-70° C.

Preferably, in the method for preparing the nano-porous carbon material, the activator at least one is selected from the grouping consisting of zinc chloride, alkali metal hydroxide and phosphoric acid; more preferably, the activator is at least one selected from the grouping consisting of zinc chloride, potassium hydroxide and the phosphoric acid; and most preferably, the activator is zinc chloride.

Preferably, in the method for preparing the nano-porous carbon material, microwave heating is conducted for 10-60 min in a microwave device with a power of 800-1500 W and a microwave frequency of 2400-2500 MHz; and more preferably, microwave heating is conducted for 15-45 min in the microwave device with the power of 1000 W and the microwave frequency of 2450 MHz.

Preferably, in the method for preparing the nano-porous carbon material, a method for the purifying comprises the following steps of: washing the resulting product obtained by microwave heating with acid and water, and then drying.

Preferably, in the method for purifying, a washing method specifically comprises the following steps of: washing the resulting product obtained by microwave heating with hydrochloric acid, separating by centrifugation to obtain a sediment, adding water in the sediment for dispersion, and then washing by centrifugation; more preferably, the washing method specifically comprises the following steps of: washing the resulting product obtained by microwave heating with hydrochloric acid of 0.5-2 mol/L, separating by centrifugation with a speed of 10000-15000 r/min, removing the supernatant to obtain a sediment, adding water in the sediment for dispersion, and then washing by centrifugation with a speed of 10000-15000 r/min; wherein the washing and dispersion is repeated in this way for at least 3 times; and more preferably, the washing method specifically comprises the following steps of: washing the resulting product obtained by microwave heating with hydrochloric acid of 1 mol/L, separating by centrifugation with the speed of 12000 r/m, removing the supernatant to obtain a sediment, adding water in the sediment for dispersion, and then washing by centrifugation with the speed of 12000 r/min, wherein the washing and dispersion is repeated in this way for at least 3 times.

Preferably, in the method for purifying, a drying method for specifically comprises the following steps of: drying for 12-36 h at 50-70° C.; and more preferably, drying for 20-30 h at 60° C.

The present disclosure has the beneficial effects:
compared with a conventional high-temperature carbonization method, the method for preparing the nano-porous carbon material of the present disclosure is simple in raw materials, convenient to operate, less in time consumption and more suitable for mass preparation and production of the nano-porous carbon materials.

DETAILED DESCRIPTION

Figure 1:
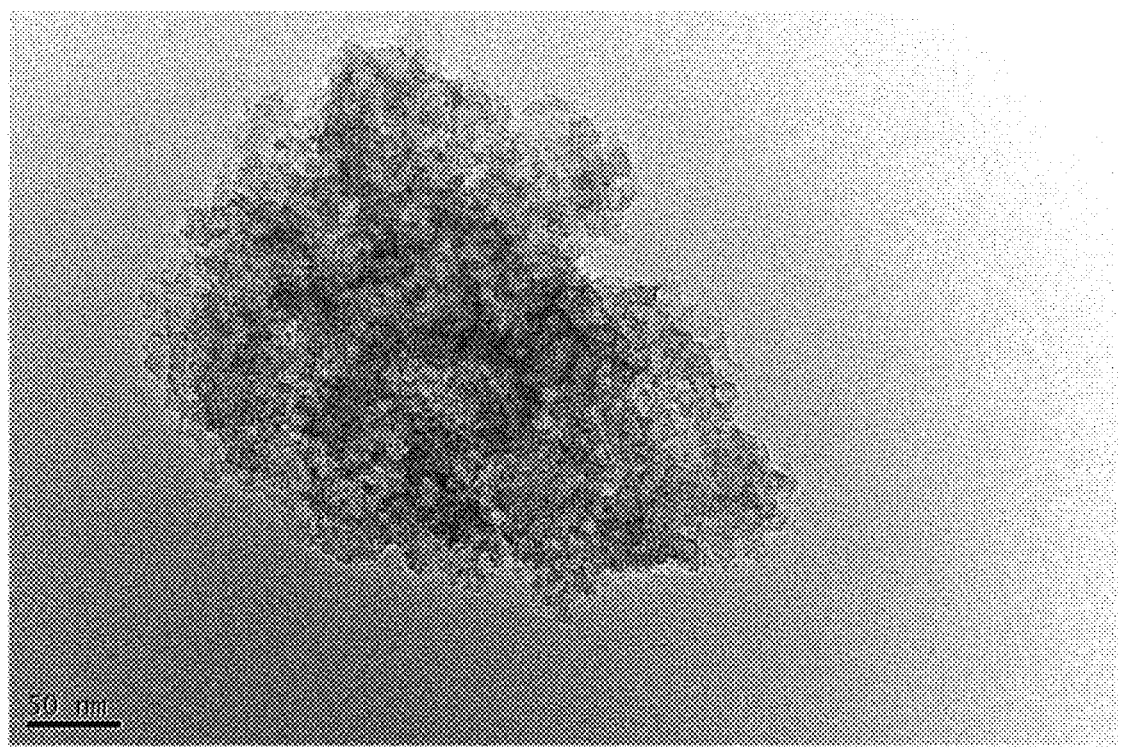
FIG. 1 is a TEM diagram of the nano-porous carbon material prepared by Embodiment of the present disclosure.

Contents of the present disclosure will be further described in detail below by specific embodiments. Unless otherwise specified, raw materials used in the embodiments are purchased via conventional commercial channels.

Embodiment 1

80 mg of polypyrrole nano-fibers and 400 mg of zinc chloride were weighed and put in a round bottom centrifugal tube of 10 mL for shaking and mixing for 5 min. After uniform mixing of the polypyrrole nano-fibers and the zinc chloride, a mixture obtained was spread out in a quartz glass tube of 50 mL. Then, the quartz glass tube was sealed and fixedly placed in a common home-use microwave oven for microwave heating for 15 min with the power of 1000 W and the frequency of 2450 MHz, and during which, a vigorous exothermic reaction between the polypyrrole nano-fibers and the zinc chloride, together with generation of plasma and sparks, might be observed. After microwave heating, the quartz glass tube was taken out and cooled to a room temperature, and then a black product was taken out and put in the hydrochloric acid solution of 1 mol/L for stirring and washing for 24 h. After stirring, the hydrochloric acid solution containing the resulting product was put in a high-speed centrifugal tube of 50 mL for centrifugation for 30 min at the speed of 12000 r/min to separate the product. After removal of the supernatant, the sediment in the centrifugal tube was redispersed by ionized water, and washed by centrifugation for 30 min at the speed of 12000 r/min. The above redispersion-washing cycle process was repeated for at least three times. After finishing the washing by centrifugation, the supernatant was removed, and the centrifugal tube was placed in a drying oven of 60° C. for drying for 24 h, to obtain the nano-porous carbon material.

Embodiment 2

80 mg of polypyrrole nano-fibers and 400 mg of zinc chloride were weighed and put in a round bottom centrifugal tube of 10 mL for shaking and mixing for 5 min. After uniform mixing of the polypyrrole nano-fibers and the zinc chloride, a mixture obtained was spread out in a quartz glass tube of 50 mL. Then, the quartz glass tube was sealed and fixedly placed in a common home-use microwave oven for microwave heating for 25 min with the power of 1000 W and the frequency of 2450 MHz, and during which, a vigorous exothermic reaction between the polypyrrole nano-fibers and the zinc chloride, together with generation of plasma and sparks, might be observed. After microwave heating, the quartz glass tube was taken out and cooled to a room temperature, and then a black product was taken out and put in the hydrochloric acid solution of 1 mol/L for stirring and washing for 24 h. After stirring, the hydrochloric acid solution containing the resulting product was put in a high-speed centrifugal tube of 50 mL for centrifugation for 30 min at the speed of 12000 r/min to separate the product. After removal of the supernatant, the sediment in the centrifugal tube was redispersed by ionized water, and washed by centrifugation for 30 min at the speed of 12000 r/min. The above redispersion-washing cycle process was repeated for at least three times. After finishing the washing by centrifugation, the supernatant was removed, and the centrifugal tube was placed in a drying oven of 60° C. for drying for 24 h, to obtain the nano-porous carbon material.

Embodiment 3

150 mg of polypyrrole nano-fibers and 750 mg of zinc chloride were weighed and put in a round bottom centrifugal tube of 10 mL for shaking and mixing for 5 min. After uniform mixing of the polypyrrole nano-fibers and the zinc chloride, a mixture obtained was spread out a quartz glass tube of 50 mL. Then, the quartz glass tube was sealed and fixedly placed in a common home-use microwave oven for microwave heating for 35 min with the power of 1000 W and the frequency of 2450 MHz, and during which, a vigorous exothermic reaction between the polypyrrole nano-fibers and the zinc chloride, together with generation of plasma and sparks, might be observed. After microwave heating, the quartz glass tube was taken out and cooled to a room temperature, and then a black product was taken out and put in the hydrochloric acid solution of 1 mol/L for stirring and washing for 24 h. After stirring, the hydrochloric acid solution containing the resulting product was put in a high-speed centrifugal tube of 50 mL for centrifugation for 30 min at the speed of 12000 r/min to separate the product. After removal of the supernatant, the sediment in the centrifugal tube was redispersed by ionized water, and washed by centrifugation for 30 min at the speed of 12000 r/min. The above redispersion-washing cycle process was repeated for at least three times. After finishing the washing by centrifugation, the supernatant was removed, and the centrifugal tube was placed in a drying oven of 60° C. for drying for 24 h, to obtain the nano-porous carbon material.

Embodiment 4

150 mg of polypyrrole nano-fibers and 750 mg of zinc chloride were weighed and put in a round bottom centrifugal tube of 10 mL for shaking and mixing for 5 min. After uniform mixing of the polypyrrole nano-fibers and the zinc chloride, a mixture obtained was spread out a quartz glass tube of 50 mL. Then, the quartz glass tube was sealed and fixedly placed in a common home-use microwave oven for microwave heating for 45 min with the power of 1000 W and the frequency of 2450 MHz, and during which, a vigorous exothermic reaction between the polypyrrole nano-fibers and the zinc chloride, together with generation of plasma and sparks, might be observed. After microwave heating, the quartz glass tube was taken out and cooled to a room temperature, and then a black product was taken out and put in the hydrochloric acid solution of 1 mol/L for stirring and washing for 24 h. After stirring, the hydrochloric acid solution containing the resulting product was put in a high-speed centrifugal tube of 50 mL for centrifugation for 30 min at the speed of 12000 r/min to separate the product. After removal of the supernatant, the sediment in the centrifugal tube was redispersed by ionized water, and washed by centrifugation for 30 min at the speed of 12000 r/min. The above redispersion-washing cycle process was repeated for at least three times. After finishing the washing by centrifugation, the supernatant was removed, and the centrifugal tube was placed in a drying oven of 60° C. for drying for 24 h, to obtain the nano-porous carbon material.

In Embodiments 1-4, methods for preparing the polypyrrole nano-fibers and vanadium pentoxide sol were as follows:

The method for preparing the polypyrrole nano-fibers comprised the following steps that: 1 mL of pyrrole monomers were added in 60 mL of hydrochloric acid solution with a concentration of 1 mol/L, and the solution was stirred for 3 min at a speed of 1000 r/min, so that the pyrrole monomers were dispersed uniformly. Then, 1 mL of the vanadium pentoxide sol was rapidly injected into the pyrrole monomer solution with stirring. Then, 1.1 g of ammonium persulfate was added in the reaction solution for continuous reaction for 1 h with stirring. Stirring was stopped 1 h later to end the reaction. The solution was put in a Buchner funnel for vacuum suction filtration to separate the resulting product, during which, it might be observed that the resulting product deposited on filter paper to form a black filter cake. The filter cake was washed with hydrochloric acid and deionized water, wherein the dosage of the solvent is at least 50 mL for each time of washing. The washing with hydrochloric acid and deionized water was repeated for at least three times. After washing, the filter cake was put in a drying oven of 60° C. for drying for 12 h, to obtain the dried polypyrrole nano-fibers.

The method for preparing the vanadium pentoxide sol comprised the following steps of 8 g of Dowex 50WX8 ion exchange resin was dispersed and dissolved into 180 mL of deionized water by stirring to obtain a dispersion liquid of the Dowex 50WX8 ion exchange resin. Then, 800 mg of ammonium metavanadate was added in the dispersion liquid of the Dowex 50WX8 ion exchange resin. After uniform stirring, the opening of a container was sealed by cellulose filter paper, and the dispersion liquid was aged for 2 weeks at room temperature.

As detected, specific areas of the nano-porous carbon materials obtained by the Embodiments 1-4 were shown in Table 1.

TABLE 1

Specific Areas of Nano-porous Carbon Materials Obtained by Embodiments 1-4

| Embodiment No. | Embodiment 1 | Embodiment 2 | Embodiment 3 | Embodiment 4 |
|---|---|---|---|---|
| Specific area ($m^2/g$) | 972 | 820 | 1007 | 873 |

Figure 2:
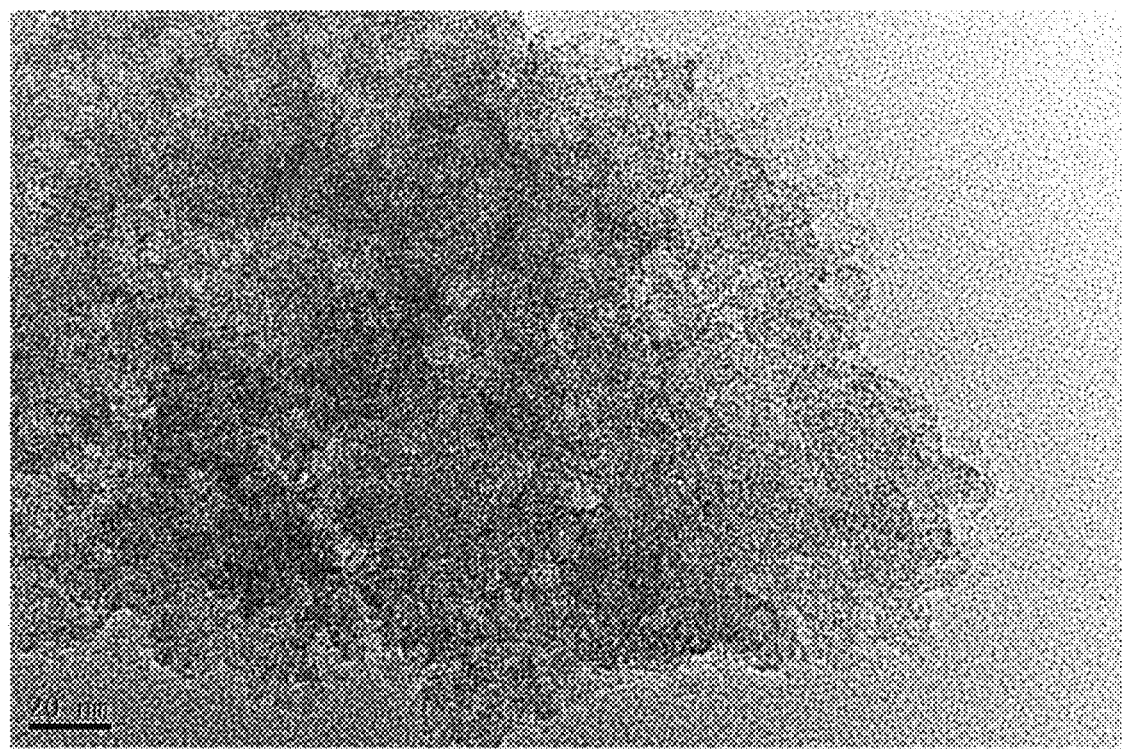
FIG. 2 is a partially enlarged TEM diagram of FIG. 1.

FIG. 1 was a TEM diagram of the nano-porous carbon material prepared by Embodiment 3 of the present disclosure. It could be seen from FIG. 1 that, the prepared nano-porous carbon material was of a clear nano-porous structure and was uniform in pore size distribution, and round micropores in orderly distribution could be observed clearly on a carbon substrate in a block shape. These micropores had a diameter of 2-10 nm and were widely distributed on the surface of and inside the carbon substrate. FIG. 2 was a partially enlarged diagram of FIG. 1. It could be seen from FIG. 2 that, besides the micropores distributed on the surface, there was a communicating network structure consisting of micropores and ultrafine micropores inside nano-porous carbon, so that the micropore area and microporosity were very high. From specific area testing with Brunner-Emmet-Teller (BET), the specific area of the nano-porous carbon was 1007 $m^2/g$, wherein the external specific area was 67 $m^2/g$, and the specific area of micropores was 940 $m^2/g$, accounting for as much as 93%.

Figure 3:
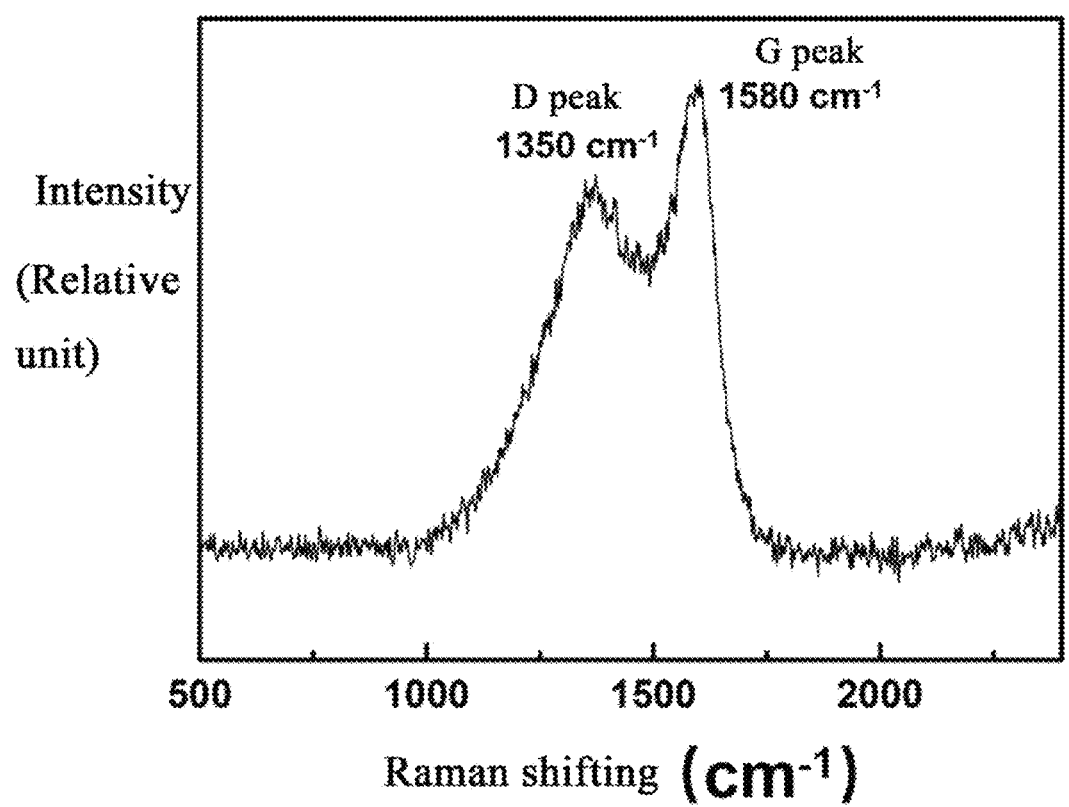
FIG. 3 is a Raman spectrum diagram of the nano-porous carbon material prepared by Embodiment 3 of the present disclosure.

FIG. 3 was a Raman spectrum diagram of the nano-porous carbon material prepared by Embodiment 3 of the present disclosure. It could be seen from FIG. 3 that, the intensity of a G peak representing crystalized graphite was obviously higher than that of D peak representing a defect structure, with a peak ratio of 1.19, indicating that the nano-porous carbon material prepared by the present disclosure was of a good graphite structure.

The invention claimed is:

1. A method for preparing a nano-porous carbon material, comprising the following steps of: mixing polypyrrole nano-fibers with an activator, conducting microwave heating for reaction, and purifying to obtain the nano-porous carbon material.

2. The method for preparing the nano-porous carbon material according to claim 1, wherein a mass ratio of the polypyrrole nano-fibers and the activator is 1:(1-5.5).

3. The method for preparing the nano-porous carbon material according to claim 2, wherein a method for preparing the polypyrrole nano-fibers comprises the following steps of:

mixing a pyrrole monomer with a solvent to obtain a pyrrole monomer solution, and reacting the pyrrole monomer solution with vanadium pentoxide sol and an oxidizing agent to obtain the polypyrrole nano-fibers.

4. The method for preparing the nano-porous carbon material according to claim 3, wherein in the method for preparing the polypyrrole nano-fibers, a ratio of raw materials is as follows: a volume ratio of the pyrrole monomer, the solvent and the vanadium pentoxide sol is 1:(40-80):(0.5-5); and ratio of the pyrrole monomer and the oxidizing agent is 1 mL:(0.5-5) g.

5. The method for preparing the nano-porous carbon material according to claim 4, wherein in the method for preparing the polypyrrole nano-fibers, the solvent is at least one selected from the grouping consisting of hydrochloric acid, sulfuric acid and nitric acid.

6. The method for preparing the nano-porous carbon material according to claim 4, wherein the vanadium pentoxide sol is obtained by reacting ammonium metavanadate with an aqueous dispersion liquid of cation exchange resin.

7. The method for preparing the nano-porous carbon material according to claim 4, wherein in the method for preparing the polypyrrole nano-fibers, the oxidizing agent is at least one selected from the grouping consisting of persulfate, ferric chloride, ferric nitrate, ferric sulfate and hydrogen peroxide.

8. The method for the preparing nano-porous carbon material according to claim 2, wherein the activator is at least one selected from the grouping consisting of zinc chloride, alkali metal hydroxide and phosphoric acid.

9. The method for preparing the nano-porous carbon material according to claim 1, wherein the microwave heating is conducted for 10-60 min in a microwave device with a power of 800-1500 W and a microwave frequency of 2400-2500 MHz.

10. The method for preparing the nano-porous carbon material according to claim 1, wherein a method of the purifying comprises the following steps of: washing the resulting product obtained by microwave heating with acid and water, and then drying.

11. The method for preparing the nano-porous carbon material according to claim 1, wherein the mass ratio of the polypyrrole nano-fibers and the activator is 1:(4-5.5).

12. The method for preparing the nano-porous carbon material according to claim 3, wherein in the method for preparing the polypyrrole nano-fibers, wherein the volume ratio of the pyrrole monomer, the solvent and the vanadium pentoxide sol is 1:(50-70):(0.8-2).

13. The method for preparing the nano-porous carbon material according to claim 4, wherein in the method for preparing the polypyrrole nano-fibers, the solvent is hydrochloric acid, and a concentration of hydrochloric acid is 0.5 mol/L-2 mol/L.

14. The method for preparing the nano-porous carbon material according to claim 6, the method for preparing the vanadium pentoxide sol comprises the following steps of: mixing the cation exchange resin with water, then adding the ammonium metavanadate for uniform mixing, and aging to obtain the vanadium pentoxide sol.

15. The method for preparing the nano-porous carbon material according to claim 14, in the method for preparing the vanadium pentoxide sol, a mass ratio of the cation exchange resin, the water and the ammonium metavanadate is 1:(10-50):(0.05-0.2).

16. The method for preparing the nano-porous carbon material according to claim 14, in the method for preparing the vanadium pentoxide sol, the time for aging is 3-20 days.

17. The method for preparing the nano-porous carbon material according to claim 4, wherein in the method for preparing the polypyrrole nano-fibers, the oxidizing agent is at least one selected from the grouping consisting of potassium persulfate, sodium persulfate and ammonium persulfate.

18. The method for preparing the nano-porous carbon material according to claim 3, wherein the method for preparing the polypyrrole nano-fibers further comprises a purifying step.

19. The method for preparing the nano-porous carbon material according to claim 1, wherein the microwave heating is conducted for 15-45 min in the microwave device with the power of 1000 W and the microwave frequency of 2450 MHz.

* * * * *